Patented Aug. 6, 1935

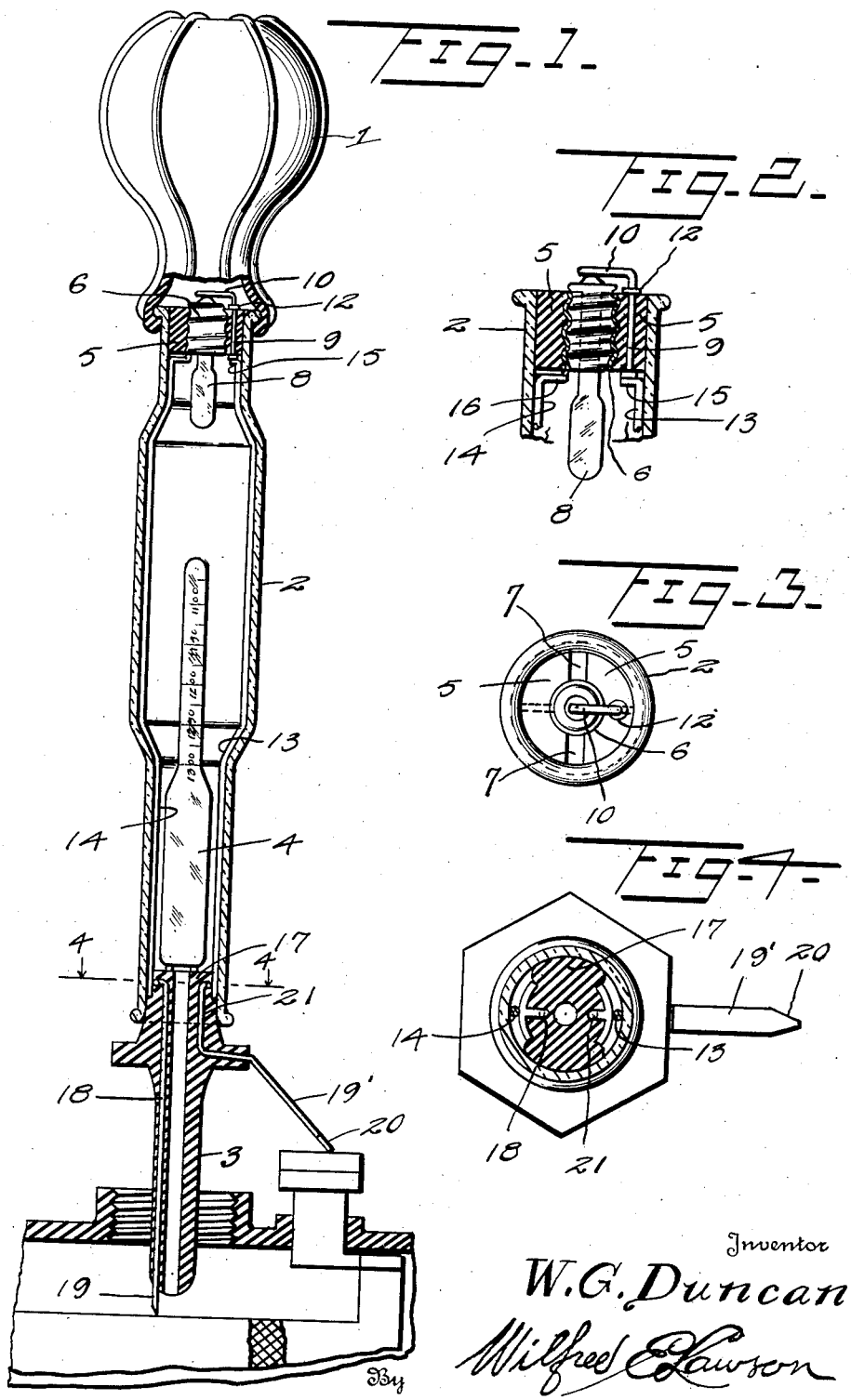

2,010,390

UNITED STATES PATENT OFFICE 2,010,390

ILLUMINATED HYDROMETER

Walter G. Duncan, Duluth, Minn., assignor of one-half to Kenneth Craig, one-fourth to Nathan Selseth, and one-fourth to John Forward, all of Duluth, Minn.

Application May 15, 1934, Serial No. 725,786

7 Claims. (Cl. 240—2)

This invention relates to the class of testing devices and pertains particularly to instruments employed for testing the specific gravity of electrolytes.

The primary object of the present invention is to provide an improved battery hydrometer having associated therewith an illuminating means whereby the hydrometer float can be easily seen and the specific gravity of the tested electrolyte readily determined.

Another object of this invention is to provide a battery hydrometer having an illuminating element mounted within the electrolyte tube and having a novel means for energizing the illuminating element from the battery which is being tested.

Still another object of the invention is to provide a battery hydrometer having an illuminating element mounted in the upper end of the electrolyte tube and having contact points projecting from the lower end of the hydrometer and so disposed that opposite electrodes of the battery under test may be contacted while the electrolyte is being drawn up into the tube of the instrument so that the illuminating element will be simultaneously energized and the depth to which the float element of the instrument sinks may be easily seen.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view partly in longitudinal section of a hydrometer constructed in accordance with the present invention.

Figure 2 is an enlarged longitudinal section through the upper end of the hydrometer tube.

Figure 3 is a view in top plan of the upper end of the hydrometer tube.

Figure 4 is a sectional view taken on the line 4—4 of Figure 1.

Referring to the drawing wherein like numerals of reference designate corresponding parts throughout the several views, the numerals 1 to 4 inclusive indicate respectively the bulb, electrolyte tube, rubber nozzle and float of a battery hydrometer of any of the usual types.

In carrying out the present invention, the upper end of the tube 2 of the instrument has frictionally engaged therein a two-part rubber collar in which the parts are indicated by the numeral 5. These two semi-circular elements which form the collar or plug are secured to a centrally disposed threaded shell 6 of the type employed for receiving an electric light bulb of the character used in hand flashlights. This threaded shell 6 forms a connection between the portions of the rubber collar and maintains the ends thereof in spaced relation so that two air spaces 7 are provided for the passage of air from the tube 2 into the bulb 1.

Threadably engaged in the shell 6 is an electric light bulb 8 which is directed downwardly in the tube 2 and which is of the type wherein the glass portion is of relatively small diameter, so that it may be threaded out backwardly through the shell 6 for removal.

Oscillatably mounted in one of the portions 5 of the collar is a terminal wire 9, the upper end of which is curved over toward the center of the illuminating element to form the spring contact 10 which engages the center contact of the element in the manner illustrated. Collars 12 mounted upon the wire 9 at the top and bottom of the portion 5 of the plug maintain the wire against longitudinal movement but permit its oscillation.

Extending longitudinally within the tube 2 are lead wires 13 and 14. The wire 13 at its upper end has the inward extension 15 which contacts with the lower end of the wire 9 while the wire 14 has a similar extension 16 which is joined to the inner end edge of the shell 6. These wires 13 and 14 run through the tube to the opposite end thereof for contact with other terminals as will now be described.

The nozzle tube 3 at its inner end is formed in the usual manner to provide a plug 17 which is introduced into the lower end of the tube 2. This nozzle has embedded therein the steel terminal wire 18 which runs throughout the length of the tube and projects from the lower end thereof and is sharpened to form a contact point 19. The upper end of this wire extends into the plug portion 17 of the tube and is turned laterally to be exposed upon the side of the plug and to be brought into frictional contact with the lower end of one of the lead wires. In the present instance, it is illustrated as being in contact with the lead wire 14.

Embedded in the rubber nozzle 3 at the inner end adjacent the plug portion 17 thereof is a steel contact or terminal arm 19'. This arm extends obliquely of the tube 3 and is pointed at its outer end, as indicated at 20. The inner end of the arm has a wire 21 leading therefrom through the side of the plug 17 so that it may be brought into electrical contact with the other one of the lead wires. It is here illustrated as being in electrical connection with the lead wire 13.

In the use of the present hydrometer, the free end of the nozzle tube 3 is introduced into the electrolyte solution of a battery cell through the usual water filling opening and the pointed end of the terminal 18 is brought into contact with a plate of the cell. At the same time, the pointed end of the terminal arm 19' is contacted with a post of the cell so that some current will be permitted to flow from the cell plate through the leads 13 and 14 and to the cell post, thus passing through and energizing the light bulb 8. It will thus be readily apparent that as the electrolyte is drawn up from the cell into the glass tube 2 so as to raise the float 14, the latter will be fully illuminated and the reading may be readily taken of the specific gravity of the electrolyte.

Should it become necessary to replace the bulb 8, this may be done by oscillating the terminal wire 9 so as to remove the spring contact 10 from across the end of the bulb, and then unscrewing or backing the bulb out from the shell 6 in which it is mounted.

From the foregoing, it will be readily apparent that the present invention will greatly facilitate the testing of batteries of the storage or secondary type without having to take any of the electrolyte away from the vicinity of the cell. Such procedure frequently results in the loss of some of the electrolyte and the spilling of the same over the exterior parts of the battery so that in addition to losing the solution, the battery parts become corroded through the contact of the acid solution therewith. With the present device, this is eliminated as it is not necessary to withdraw the nozzle 3 from the battery cell as the reading may be readily taken while maintaining the hydrometer in the vertical position in which it is placed to draw the electrolyte solution thereinto, because of the complete illumination of the interior of the tube. Even though the battery may be in a location which is dark, it will thus be seen that the float in the electrolyte solution can be readily seen and the specific gravity of the solution determined.

What is claimed is:—

1. In an electrolyte testing instrument having a tube, a bulb at one end, a nozzle at the other end and a float within the tube, an electric lamp socket open at each end, means securing said socket in said tube at the end adjacent said bulb, an electric lamp mounted in said socket to depend into the tube, said lamp being of a character to be removed through said socket, an electric current conductor connected at one end with said socket and leading through said tube to the opposite end of the latter, a shiftable contact mounted upon said socket carrying means and arranged for engagement with a portion of the electric lamp in the socket, said contact when shifted to one position permitting removal of the lamp, an electric current conductor connected at one end with said contact and extending through the tube to the opposite end of the latter, and a pair of electrodes at the said opposite ends of the tube each connected with one of said conductors and said electrodes being disposed for electrical contact with opposite poles of the cell of a secondary battery when the nozzle is introduced into the cell.

2. In an electrolyte testing instrument having a tube, a bulb at one end, a nozzle at the other end and a float within the tube, an electric lamp socket, means securing said socket in said tube at the end adjacent said bulb, an electric lamp mounted in said socket to depend into the tube, an electric current conductor connected at one end with said socket and leading through said tube to the opposite end of the latter, a shiftable contact mounted upon said socket carrying means and arranged for engagement with a portion of the electric lamp in the socket, an electric current conductor connected at one end with said contact and extending through the tube to the opposite end of the latter, an electrode embedded in and extending longitudinally of said nozzle and projecting at one end from the free end of the nozzle and having its other end electrically connected with a conductor, and a second electrode embedded at one end in said nozzle and electrically connected with the other conductor and having its other end extending laterally from the nozzle.

3. In an electrolyte testing instrument, a transparent tube, a bulb at one end of the tube, a float within the tube, an incandescent electric lamp carried by the tube, a nozzle at the other end of the tube having a portion formed at one end for engagement with the said other end, a pair of electrodes each having a portion embedded in said nozzle, one of said electrodes extending through the length of the nozzle and projecting from the end of the same remote from the tube, the other of the electrodes having a portion extending laterally from the nozzle, said electrodes being designed for contact with opposite poles of a secondary battery cell when the nozzle is introduced into the cell, and electric current conducting means leading from said electrodes to said lamp.

4. In an electrolyte testing instrument, a tube, a bulb at one end of the tube, a float within the tube, an incandescent electric lamp mounted within the tube, a nozzle comprising an elongated tubular body having one end in the form of a stopper for insertion into the other end of said tube, an electrode embedded in and extending through said nozzle and projecting at one end to the end of the nozzle remote from the stopper, the other end of the electrode being exposed upon the side of the stopper, a second electrode having a portion embedded in the stopper and extending laterally exteriorly from the same, a portion of said second electrode being exposed upon the side of the stopper, and electric current conducting elements leading from the end of the tube in which said stopper is secured to said lamp, said stopper when inserted in the tube frictionally engaging said conductors.

5. In an instrument having a tube, a bulb at one end thereof, a float in the tube, an electric lamp carried by the tube and current conductors leading to the said lamp, a nozzle of insulation material having one end formed for detachable connection with the end of the tube opposite the bulb, an electrode embedded in and extending throughout the length of the nozzle and projecting from the end thereof remote from the tube, and a second electrode having a portion embedded in said nozzle and projecting laterally therefrom, said electrodes having exposed terminals at the said one end of the nozzle for contact with said current conductors.

6. A nozzle for detachable connection with a tubular body carrying a pair of electric conductors, comprising an elongated tubular body of insulation material formed at one end for detachable connection with an end of the first body, and a pair of electrodes each having a portion embedded in the body of insulation and one having one end projecting from the end of the body of insulation remote from the said one end thereof, the other electrode having an end projecting from the side of the body of insulation, the other ends of said electrodes being exposed at the said one end of the body of insulation for contact with said conductors.

7. In a testing instrument having a transparent tube, a float therein, a nozzle detachably connected with one end and means at the other end for drawing liquid into the tube, an incandescent electric element housed in said tube, current conductors completely housed in the tube and connected with said element, a pair of electrodes carried entirely by said nozzle, and means for establishing a frictional connection between the electrodes and the conductors when the nozzle is coupled with the tube.

WALTER G. DUNCAN.